3,389,198
PROCESS FOR MOLDING CELLULAR POLYOLEFINS
Donald K. Taber, Lancaster Court, Del., assignor to Hercules Incorporated, a corporation of Delaware
Filed Apr. 15, 1965, Ser. No. 448,491
10 Claims. (Cl. 264—52)

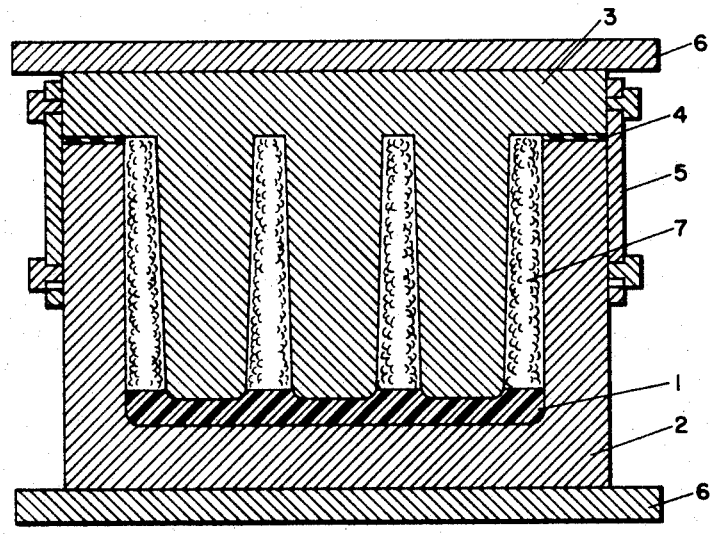
FIG. I
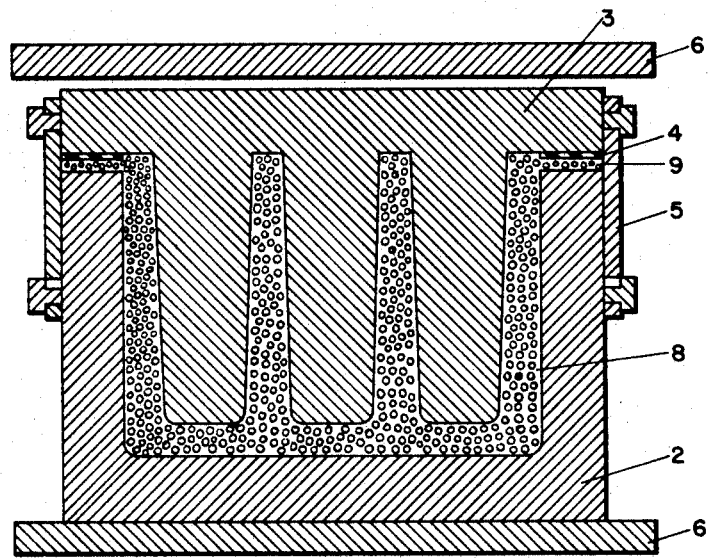
FIG. II
DONALD K. TABER
INVENTOR.
BY Ernest G. Peterson
AGENT June 18, 1968     D. K. TABER     3,389,198
PROCESS FOR MOLDING CELLULAR POLYOLEFINS
Filed April 15, 1965     2 Sheets-Sheet 2
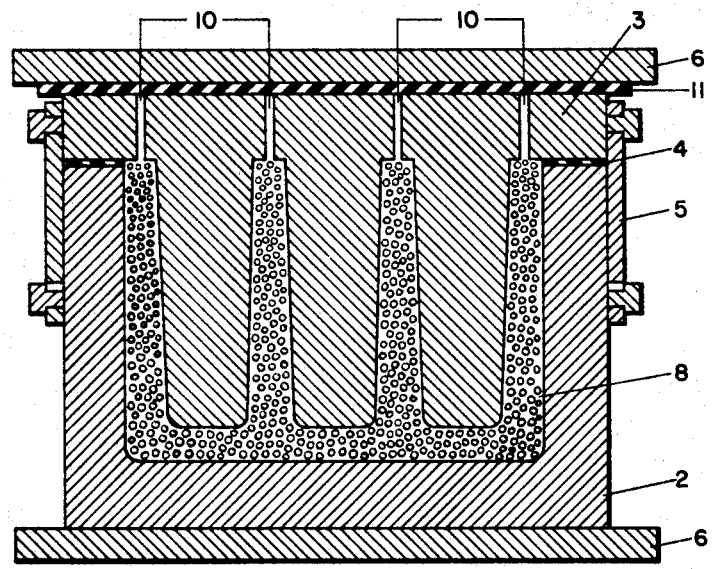
FIG. III
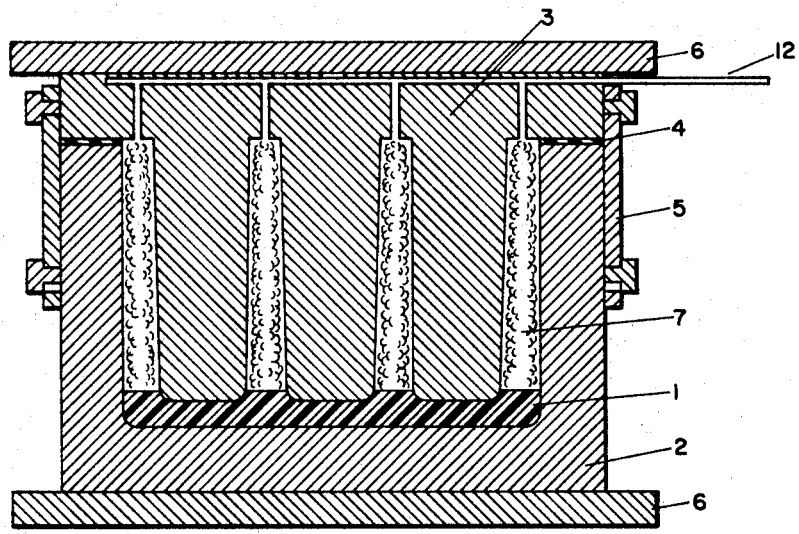
FIG. IV
DONALD K. TABER
INVENTOR.
BY Ernest G. Peterson
AGENT

ABSTRACT OF THE DISCLOSURE

Describes an "in-mold" process of preparing cellular polyolefin molded articles by heating to the softening point, in a sealed mold, a mixture of polyolefin, azido cross-linking agent and blowing agent while under gas pressure so as to prevent expansion, reducing the pressure to allow expansion within the confines of the mold and cooling prior to opening the mold.

This invention relates to a process of preparing formed articles of cellular polyolefin by a unique process wherein the foaming of the polyolefin is carried out within a mold to produce an article of the desired shape.

It is now well known that polyolefins can be foamed to produce a cellular structure and that various shaped articles can be produced therefrom by thermoforming, compression molding, shaping by cutting, etc. All of these processes result in a considerable loss of material and time due to the trimming, finishing, etc., processes that must be carried out to produce the finished article.

Now in accordance with this invention, it has been found that a finished, molded article of cellular polyolefins can be produced by heating a mixture of a polyolefin, an azido cross-linking agent, and a blowing agent, within the confines of a closed mold to a temperature above the softening point of the mixture and sufficient to release gas from the blowing agent and to effect modification of the polyolefin by the azido cross-linking agent, while maintaining sufficient pressure on the mixture, either autogenically or gas added from an external source, to prevent expansion of the mixture during the heating period, then bleeding off the gas so as to allow expansion within the confines of the mold and cooling the mixture in the mold so as to prevent any further expansion when the mold is opened.

The process of the inveniton will be more fully described by reference to the attached drawings, demonstrating the process applied to the manufacture of a partitioned box. FIGURE I represents the female and male members of a mold held in a press during the heating operation. The mixture 1 of polyolefin, azido cross-linking agent and blowing agent is placed in the bottom of the female member 2 of the mold, which for convenience is preheated to at least the softening temperature of the mixture and the male member 3 of the mold, which is also preheated, is then placed in position, with a gasket 4 between the two mold members to prevent the loss of gas, and is held in place by the holding clamp 5. The whole assembly is set in a platen press 6 and heated under press pressure at a temperature above the softening point of the composition and sufficient to release the gas from the blowing agent. During the heating period, the blowing agent releases gas within the molten mixture 1, and as the mixture expands, the gas 7 in the mold above the mixture is compressed. With the holding clamp 5 mechanically locked, the force applied by the press is released at the end of the heating cycle, allowing the mold to open to the limit of the holding clamp (about $\frac{1}{16}$ inch). With release of the gas pressure, the molten plastic expands to completely fill the mold with the cellular polyolefin 8, as shown in FIGURE II, with a slight flash 9 at the parting line. The mold is then removed from the press, cooled to below the softening temperature of the polyolefin, generally from 65 to 100° C. below the softening temperature, and opened. The slight flash is then trimmed off and the finished partitioned box is ready for use.

Many modifications can be made in the apparatus used for carrying out the process. Thus, as shown in FIGURE III, the male mold 3 can contain vent holes 10 to permit the uniform escape of gases when pressure on the press platens 6 is released. These holes are sealed during the heating period by means of a silicon rubber sheet gasket 11 placed between the press platen and the top surface of the male mold. The vent holes are preferably of very small diameter, generally in the range of 0.005 to 0.010 inch, so that there is essentially no flashing and hence no trimming of the finished article is necessary.

In still another modification, as shown in FIGURE IV, gas can be introduced from an external source through a manifold 12, to augment the pressure of the gases 7 during the heating cycle. By introducing gas in this manner to augment the pressure of the gases, lower foam densities and smaller, more uniform cell structure can be obtained.

The molds employed in the process of this invention can be of any internal shape or dimensions capable of withstanding the gas pressures generated or applied on the plastic mass prior to the final expansion. They can be matched sets of male and female molds or hollow cavities. Metal inserts can be positioned in the mold to yield composite structures of greater strength or utility. Thus, such articles as battery boxes, partitioned cartons for soft drinks, milk, beer, etc., ice containers, automobile sun visors, etc., of cellular polyolefins can be produced by a simple operation. One of the very surprising and useful effects obtained by the process is that partitioned boxes can be so produced, the expansion occurring uniformly into all of the spaces of the mold.

Any polyolefin can be foamed and shaped by the process of this invention. Exemplary of the polyolefins are high and low density polyethylene, stereoregular polypropylene, crystalline and amorphous ethylene-propylene copolymers, ethylene-propylene-diene terpolymer rubbers, and blends of any of these polymers, etc. For many applications, it is desirable to increase the flexibility of the final article, particularly in the case of the crystalline polymers, by adding an elastomeric hydrocarbon polymer to the blend of thermoplastic polymer, cross-linking agent, and blowing agent, and then processing by the invention. The amount of the elastomeric polyolefin incorporated can vary over a wide range. Exemplary of the elastomeric hydrocarbon polymers that can be so incorporated are polyisobutylene, butyl rubber (a polyisobutylene which contains a relatively small amount of unsaturation), ethylene-propylene copolymer rubbers, (i.e., amorphous copolymers), ethylene-propylene-diene terpolymer rubbers, etc. Exemplary of the dienes in the latter terpolymers are dicyclopentadiene, butadiene, isoprene, norborene, 5-methyl-2-norbornene, 1,4-hexadiene, 6-methyl-1,5-heptadiene, etc.

Any of the well-known chemical blowing agents can be used in the preparation of the foamed articles in accordance with this invention, as for example, azobis (formamide), diazoaminobenzene, N,N'-dinitrosopentamethylene tetramine, N,N'-dimethyl-N,N'-dinitrosoterephthalamide, p,p'-oxy-bis(benzene sulfonyl semicarbazide), azobis(isobutyronitrile), p,p'-oxy-bis(benzene sulfonyl hydrazide), p,p'-diphenyl-bis(sulfonyl hydrazide), benzene-sulfonyl hydrazide, m-benzene-bis(sulfonyl hydrazide), etc. Accordingly, any compound which decomposes to yield at least one mole of gas per mole of blowing agent at a temperature of 190° C. or less may be used.

Any azido cross-linking agent can be used in the preparation of the foamed articles in accordance with this invention. Thus, any poly(sulfonazide), i.e., any compound having the general formula $$R[SO_2N_3]_x$$

where R is an organic radical inert to the cross-linking reaction and $x$ is an integer greater than 1, can be used in the process of this invention. Preferably, $x$ will be an integer from 2 to 100 and R will be selected from the group of organic radicals consisting of alkylene, arylene, aralkylene, and alkarylene radicals; however, these radicals can also contain ether, alcohol, halogen, etc., groups which are inert to the cross-linking reaction. Exemplary of the poly(sulfonazide)s that may be used are 1,7-heptane-bis(sulfonazide), 1,10-decane-bis(sulfonazide), 1,11-undecane - bis(sulfonazide, 1,12 - dodecane - bis(sulfonazide), 7-oxa-tridecane-1,13-bis(sulfonazide), 6-thiaundecane-1,11-bis(sulfonazide); chloroaliphatic poly(sulfonazide)s such as the poly(sulfonazide) produced from a chloro- and sulfochlorinated mixture of petroleum hydrocarbons containing at least one chlorine atom and at least two sulfonazide groups per molecule; 1,9,18-octadecanetris(sulfonazide), poly(ethylene sulfonazide), poly(sulfonazido-methyl styrene), 1,3- and 1,4-bis(sulfonazidomethyl benzene), 1,3-benzene bis(sulfonazide), 1-octyl-2,4,6-benzene tris(sulfonazide), 4,4'-diphenylmethane bis(sulfonazide), 4,4'-diphenyl ether bis(sulfonazide), 4,4'-bis-octadecyl biphenyl-3,5,3',5'-tetra(sulfonazide), 4,4'-diphenyl disulfide bis(sulfonazide), 1,6-bis(4'-sulfonazidophenyl) hexane, 2,7-naphthalene bis(sulfonazide), etc. Another class of azido cross-linking agents that can be used are azidoformates which have the general formula $$R(-O\overset{O}{\underset{\|}{C}}N_3)_x$$

where $x$ is a least 2, preferably from 2 to 4, and R is an organic radical, inert to cross-linking reactions, containing at least one carbon atom per azidoformate group. Exemplary of the new azidoformates of this invention are those compounds where R is alkylene, as for example in ethylene bis(azidoformate), trimethylene bis(azidoformate), tetramethylene bis(azidoformate), pentamethylene bis(azidoformate), hexamethylene bis(azidoformate), 1,9 - nonane-bis(azidoformate), 1,10-decane-bis(azidoformate), etc.; cycloalkylene, as for example in cyclohexylene-1,2-bis(azidoformate), cyclohexylene-1,3-bis(azidoformate), and cyclohexylene-1,4-bis(azidoformate); arylene, as for example in o-, m-, and p-phenylene bis(azidoformate); arylene-dialkylene, as for example in o-, m-, and p-xylylene bis(azidoformate); alkylene-diarylene, as for example in 2,2-isopropylidene-bis(p, p'-phenylazidoformate); cycloalkylene-dialkylene, as for example in 1,4-cyclohexane-dimethyl bis(azidoformate); oxydialkylene, as for example in 2,2'-oxydiethyl bis(azidoformate), 2,2'-oxydipropyl bis(azidoformate); thiodialkylene, as for example in 2,2'-thiodiethyl bis(azidoformate), 4,4'-thiodibutyl bis(azidoformate); alkylene poly(oxyalkylene), as for example in 2,2'-ethylenedioxyethyl bis(azidoformate), i.e., ethylene bis(oxyethylene azidoformate), the tris(azidoformate) of glycerol-propylene oxide adduct; alkylene-bis(polyoxyalkylene), as for example the bis(azidoformate)s of poly(ethylene glycol) and poly(propylene glycol), and carbyl tetrakis (alkyleneoxyalkylene), as for example the tetraazidoformate of pentaerythritol-propylene oxide adduct.

The amount of the azido cross-linking agent utilized can be varied over a wide range and will depend upon the type of azido cross-linking agent used, the polymer being foamed, the properties desired in the final foam, etc. It must be an amount that is sufficient to prevent rupture of the cell walls when the foaming action takes place. Generally, it will be an amount of from about 0.01% up to about 10% or more, preferably from about 0.05% to about 5% and more preferably from about 0.08% to about 2% by weight of the polymer. Depending upon the amount and type of azido cross-linking agent used, actual cross-linking of the polymer may or may not occur. Thus, for example, at low levels of polysulfonazides, particularly those of high molecular weight, there will be an insufficient amount to achieve actual cross-linking (insolubilization of the polymer), yet the polymer will be modified to such as extent that collapse of the cell walls is prevented, which collapse would occur if no azido cross-linking agent were used. Larger amounts of the azido cross-linking agent will be used when a cross-linked, foamed product is desired. The amount of blowing agent incorporated will obviously depend upon the degree of blowing desired; that is, the density desired for the final foamed product and the types of blowing agent used. The process of this invention is of particular importance in the production of articles of foamed polyolefins.

As pointed out above, the composition which is heated in the mold to produce the cellular thermoplastic polymer is a mixture or blend of the polymer, azido cross-linking agent and blowing agent. Any desired means can be used in mixing or blending these components. The azido cross-linking agent and the blowing agent can be mixed into a diluent such as acetone, which may also contain a stabilizer or other modifier for the polymer, and the polymer in finely divided form may then be added and mixed into a slurry. On evaporation of the diluent, an intimate mixture of the polymer, cross-linking agent and blowing agent is obtained. The azido cross-linking agent and the chemical blowing agent can also be blended in dry form with the powdered polymer by means of a high-speed mixer such as a Waring Blendor or Henschel mill. When the polyolefin, cross-linking agent and blowing agent are compounded, for example by extrusion, Banbury mixing or on a hot roll mill, savings in time and heat can be achieved by introducing the compounded mixture, while still hot, into the mold which has been preheated to or near the temperature at which the heating of the mixture in the mold is to be carried out. The dry flake mix can be used without further compounding if the polymer has a high melt index, but generally a more uniform cell structure in the foam is obtained when a preform of the compounded mixture is used. Obviously, many other variations can be made in the method of blending or mixing this three-component composition. In addition, additives such as light and heat stabilizers, dyestuffs and pigments, metallic powders, flame retardants, including organic and inorganic flame retardants, such as chlorinated paraffin wax, antimony oxide and other such materials, cell nucleating agents, etc. can be incorporated in the composition that is foamed.

The temperature and length of the heating cycle will depend on the polyolefin being foamed, the azido cross-linking agent used, the blowing agent used, the dimensions of the article being made, particularly the wall thickness of the article. In general, it will be a temperature above the softening point of the composition and sufficient to release the gas from the blowing agent and to effect the azido modification of the polymer. Accordingly, the cross-linking and blowing temperature will be from the softening temperature up to about 300° C. or higher. The period of time required will depend on the temperature used, the wall thickness of the article being made, etc., but usually will be from about 1 to about 15 minutes.

As pointed out above, the mixture of polyolefin, blowing agent and azido cross-linking agent is heated in the mold under gas pressure. This may be gas pressure caused by compression of the gas in the mold when the plastic expands, or it may be gas pressure obtained by introducing gas into the mold cavity to augment such gas pressure. In any event, the gas pressure in the mold during the heating period will be greater than atmospheric, and preferably from optimum cell structure and lowest foam densities will be from about 200 p.s.i. to about 1,200 p.s.i., at which latter point expansion of the mass is generally completely restrained. Higher pressures can be used but are not believed to contribute any particular advantage.

At the end of the heating period, the pressure is reduced by bleeding off sufficient gas to allow the plastic mass to expand and completely fill the mold. The mold is then at least partially cooled before it is opened so that the plastic solidifies and no further expansion can take place when the mold is opened.

The following examples illustrate the process of this invention. All parts and percentages are by weight unless otherwise indicated. The abbreviation RSV is used to denote the reduced specific viscosity of the polymer as measured on a 0.1% solution of the polymer in decahydronaphthalene at 135° C.

EXAMPLE 1

A mixture of 100 parts of polypropylene having a melt index ($I_2$) at 230° C. of 3.5, 0.5 part of Santonox, i.e., 4,4′-thiobis(6-tert-butyl-m-cresol), 5.0 parts of azo bis(formamide) and 0.75 part of a chloro poly(sulfonazide), prepared from a commercial mixture of hydrocarbons having 11–12 carbon atoms per molecule and containing an average of 8% chlorine and 2 sulfonazide groups per molecule, was compounded for 4 minutes on a 2-roll mill at 170° C. The compounded sheet was then removed from the mill and 100 grams of the hot, expandable composition was placed in the bottom of the female part of a partitioned, matched mold box (454 cc. capacity), which had previously been heated to 225° C. The preheated male part of the mold was then placed in position and the assembly was set in a platen press at 225° C. and held under 5 tons of pressure for 3.0 minutes. During this heating period, the chemical blowing agent (azo bis(formamide)) was decomposed within the molten plastic to liberate gas, causing the plastic to expand and compress the air in the mold cavity until equilibrium pressure between the blowing gases in the polymer and the compressed air was achieved. At the end of the heating cycle, the holding clamp was mechanically locked and the force applied by the press was then released, allowing the mold to open to the limit of the holding clamp (about 1/16 inch). With release of the gas pressure, the molten plastic expanded to completely fill the mold, with a slight flash at the parting line. The mold was then removed from the press and cooled. The partitioned box so produced was of molded polypropylene foam, which had a density of 10 lbs./cu. ft. and a fine uniform cell structure.

EXAMPLE 2

Example 1 was repeated except that only 75 grams of the hot, expandable composition was placed in the mold and the foam density of the box so produced was 7 lbs./cu. ft.

EXAMPLE 3

The procedure of Example 1 was repeated, except that in this case vent holes had been drilled through the male member of the mold into the mold cavity to permit uniform escape of gases on release of pressure. These holes were sealed during the heating cycle by means of a silicone rubber sheet placed between the press platen and the top of the surface of the male mold member. The amount of the hot, expandable composition used in this case was 60 parts and the holding clamps were adjusted to prevent any separation of the male and female parts of the mold. At the end of the heating cycle, the force applied by the press platens was released, permitting the escape of the gas through the vent holes. The mold was completely filled and the partitioned box so produced was made of a foam having a density of 8.6 lbs./cu. ft. with a fine cell structure. There was no flash around the top of the box.

EXAMPLE 4

The procedure of Example 3 was repeated, except that in this case 150 grams of a hot, expandable composition made by 2-roll milling 100 parts of polypropylene ($I_2$ at 215° C. of 2.8), 0.64 part of azo bis(formamide) and 0.5 part of 1, 10-decane disulfonazide was used. The foam density of the box so produced was about 21 lbs./cu. ft. and the surfaces of the box were smooth.

EXAMPLE 5

Example 3 was repeated, except that 55 grams of a hot, expandable composition produced by 2-roll milling 50 parts of polypropylene ($I_2$ at 230° C. of 3.5), 50 parts of poly(isobutylene) (weight average molecular weight of 90,000–100,000), 0.5 part of Santonox, 5.0 parts of azo bis(formamide), and 0.75 part of chloro poly (sulfonazide). The partitioned box so produced was a fine celled foam, which had a density of 7 lbs./cu. ft. The box walls were extremely flexible in comparison to the rigid walls of the box prepared without any poly(isobutylene).

EXAMPLES 6–8

In these examples, externally applied gas pressure was used to restrain expansion during the heating cycle.

A steel mold with an internal cavity of 5.5 x 7.25 x 1″ was preheated in a cored electric press at 227° C. The mold was equipped with a manifold system and silicone rubber gaskets for the introduction and retention of gas under high pressure inside the cavity. The foamable composition was prepared by blending on a 2-roll mill at 170° C. for 4–5 minutes a mixture of 100 parts of polypropylene ($I_2$ at 230° C. of 3.8), 0.1 part of precipitated calcium carbonate, as nucleator, and a given quantity of azo bis(formamide) and a given quantity of 1,10-decane disulfonazide. A given amount of the hot, expandable composition was then placed in the mold, the mold was closed and pressured with nitrogen gas. After a heating time of 3.5 minutes, the nitrogen gas pressure was rapidly released (3 second exhaust time) and the mold was cooled in the press to room temperature. In every case, the foamed article so produced was 5.5 x 7.25 x 1″ in size. In the following table is set forth the percent of the 1,10-decane disulfonazide (DSA) and the percent of azo bis(formamide) blowing agent in the expandable composition, along with the amount of the expandable composition charged to the mold and the nitrogen pressure introduced into the mold. The density of the foam and cell size are indicated for each example.

| Ex. | Percent DSA | Percent Blowing Agent | Grams of Mixture Charged | $N_2$ Press., p.s.i. | Foam Lbs./cu. ft. | Cell Structure |
|---|---|---|---|---|---|---|
| 6 | 0.4 | 5.0 | 55 | 400 | 5.5 | Very fine cell of <0.25 mm. |
| 7 | 0.15 | 5.0 | 55 | 400 | 6.0 | Fine cell of <0.5 mm. |
| 8 | 0.4 | 2.3 | 94 | 400 | 9.0 | Very fine cell. |

EXAMPLE 9

Example 6 was repeated, except that 50 parts of poly(isobutylene) (molecular weight of 90,000–100,000) was substituted for 50 parts of the polypropylene in preparing the moldable composition. The resultant foamed article had a density of 6 lbs./cu. ft. and was very flexible. The average cell diameter of the foam was <0.1 mm.

EXAMPLE 10

The procedure of Example 3 was repeated, except that in this case the moldable composition was prepared by 2-roll milling at 150° C. for 4–5 minutes a mixture of 100 parts of polyethylene ($I_2$ at 190° C. of 0.6), 5.7 parts of azo bis(formamide), 0.1 part of sodium carbonate as nucleator and 0.4 part of 1,10-decane disulfonazide. The walls of the box so produced was a foam of very fine cell structure which had a density of 8 lbs./cu. ft.

EXAMPLE 11

Example 3 was repeated, except that the mold (375 cc. capacity) was for an open box instead of for a partitioned box and 122 grams of an expandable composition prepared by compounding on a 2-roll mill 100 parts of a crystalline ethylene-propylene copolymer containing 9 mole percent ethylene (RSV of 3.8 in decahydronaphthalene at 135° C.), 0.93 part of azo bis(formamide), 0.08 part of 1,10-decane disulfonazide and 0.2 part of sodium carbonate was used. The heating cycle was 2 minutes at 225° C. The foam walls of the box so produced had a density of about 22 lbs./cu. ft. and a uniform, fine cell structure.

EXAMPLE 12

Example 11 was repeated, except that the heating cycle was 4 minutes and the expandable composition was prepared by compounding a mixture of 90 parts of polypropylene ($I_2$ at 230° C. of 4.1), 10 parts of an ethylene-propylene copolymer rubber having an RSV of 2.05 and containing 28 mole percent propylene, 1 part of azo bis(formamide), 0.1 part of 1,10-decane disulfonazide, and 0.2 part of sodium carbonate. The foam walls of the box so produced had a density of about 22 lbs./cu. ft., and had a fine, uniform cell structure.

EXAMPLE 13

The procedure of Example 3 was repeated, except that in this case there was used 130 grams of a hot, expandable composition made by 2-roll milling at 150° C. for 2.5 minutes 100 parts of high density polyethylene ($I_2$ at 190 C. of 1.1), 0.92 part of azo bis(formamide) and 0.04 part of tetramethylene bis(azidoformate). The mold was heated at 238° C. for 4 minutes. The walls of the box so formed were of a fine, uniform cell foam which had a density of 20 lbs./cu. ft.

EXAMPLE 14

The procedure of Example 3 was repeated, except that there was used 145 grams of a hot, expandable composition made by 2-roll milling at 150° C. for 3 minutes 100 parts of an ethylene-propylene copolymer rubber containing about 33% propylene and having an $I_{10}$ of 1.96 at 190° C., 2.0 parts of azo bis(formamide), 0.4 part of 1,10-decane disulfonazide and 1.0 part of aluminum powder. The mold was heated at 238° C. for 4 minutes. The walls of the box so formed were of an extremely fine uniform cell foam which had a density of 24.9 lbs./cu. ft. The box was very flexible.

EXAMPLE 15

The procedure of Example 3 was repeated, except that there was used 120 grams of a hot, expandable composition made by 2-roll milling at 138° C. for 3–4 minutes, 100 parts of an ethylene-propylene copolymer containing 83% of ethylene and having an RSV of 2.7, 1.0 part of azo bis(formamide), 0.3 part of 1,10-decane disulfonazide and 0.2 part of sodium carbonate. The mold was heated at 225° C. for 4 minutes. The resulting box had walls of a fine celled foam structure with a density of about 20 lbs./cu. ft.

EXAMPLE 16

In this example, an automobile sun visor with a steel support rod was prepared. The mold used had a cavity of the proper size and shape (7¼ x 5½ x 1 inches) with a steel support rod held in position within the mold cavity. Two silicone gaskets (about 0.060 inch thick) were fitted into the bottom and top of the manifold running around the inner cavity of the mold. Gas under pressure was introduced into the manifold through a fitting in the bottom half of the mold. The foamable composition used was prepared by blending for 4 minutes at 170° C. on a 2-roll mill a mixture of 100 parts of polypropylene ($I_2$ of 3.9 at 230° C.), 5 parts of azo bis(formamide), 0.4 part of 1,10-decane disulfonazide, and 0.1 part of sodium carbonate as nucleator. The material was then sheeted off the mill and 60 grams of the blend in a 5 x 7 inch preform was folded around a steel rod and inserted in the mold, which had been preheated to 225° C. The press was closed and 20 tons clamping pressure was applied. Nitrogen was introduced into the mold and maintained at 400 p.s.i.g. during the heating cycle (225° C.) of 3.5 minutes. The gas pressure was then suddenly released (exhaust time of 3 sec.) and the mold was cooled for 12 minutes. The sun visor so produced was a very fine celled foam having a density of 6.8 lbs./cu. ft.

What I claim and desire to protect by Letters Patent is:

1. The process of preparing molded articles of cellular polyolefins which comprises heating in a sealed mold a mixture of a polyolefin, an azido cross-linking agent and a blowing agent, to a temperature above the softening point of said mixture and sufficient to release the gas from said blowing agent and to effect azido modification of the polyolefin, while under sufficient gas pressure to prevent expansion, reducing the pressure to allow expansion within the confines of the mold, and then cooling to a temperature at which no further expansion takes place.

2. The process of claim 1 wherein an inert gas is introduced into the mold to increase the pressure in the mold during the heating step.

3. The process of claim 1 wherein the cross-linking agent is an aliphatic polysulfonazide.

4. The process of claim 1 wherein the cross-linking agent is an alkylene bis(azidoformate).

5. The process of claim 1 wherein the polyolefin is polypropylene.

6. The process of claim 1 wherein the polyolefin is polyethylene.

7. The process of claim 1 wherein the polyolefin is an ethylene-propylene copolymer.

8. The process of claim 3 wherein the polyolefin is a mixture of stereoregular polypropylene and an elastomeric polyolefin.

9. The process of claim 8 wherein the elastomeric polyolefin is polyisobutylene.

10. The process of claim 8 wherein the elastomeric polyolefin is an ethylene-propylene copolymer rubber.

References Cited

UNITED STATES PATENTS

| | | | |
|---|---|---|---|
| 2,039,096 | 4/1936 | Lukens | 264—327 XR |
| 2,541,297 | 2/1951 | Sampson et al. | 264—327 XR |
| 2,751,627 | 6/1956 | Lindemann | 264—55 XR |
| 2,768,407 | 10/1956 | Lindemann | 264—55 XR |
| 2,948,664 | 8/1960 | Rubens et al. | 264—51 XR |
| 2,948,665 | 8/1960 | Rubens et al. | 264—53 XR |
| 3,003,192 | 10/1961 | Pfleumer | 264—55 |
| 3,098,831 | 7/1963 | Carr | 204—159.18 XR |
| 3,098,832 | 7/1963 | Pooley et al. | 204—159.18 XR |
| 3,124,627 | 3/1964 | Hood | 264—327 XR |
| 3,268,635 | 8/1966 | Kraus et al. | 264—55 XR |
| 3,291,873 | 12/1966 | Eakin | 264—55 XR |

JAMES A. SEIDLECK, *Primary Examiner.*

PHILIP E. ANDERSON, *Examiner.*